United States Patent

Anderson

[15] 3,640,565
[45] Feb. 8, 1972

[54] TELESCOPIC COVER ASSEMBLY FOR OPEN BED VEHICLES AND LATCH ASSEMBLY FOR USE THEREWITH

[72] Inventor: Edwin G. Anderson, 804 Northey Drive, Sacramento, Calif. 95833

[22] Filed: Feb. 5, 1970

[21] Appl. No.: 8,864

Related U.S. Application Data

[63] Continuation-in-part of Ser. No. 815,309, Apr. 11, 1969, Pat. No. 3,578,378.

[52] U.S. Cl. ..........................................296/137 B
[51] Int. Cl. ...............................................B60j 7/10
[58] Field of Search ..............296/100, 137 B, 50; 49/234, 49/235

[56] References Cited

UNITED STATES PATENTS

| | | | |
|---|---|---|---|
| 2,074,358 | 3/1937 | Bixel | 296/100 |
| 2,853,340 | 9/1958 | Hershberger | 296/100 |
| 3,165,352 | 1/1965 | Hallock | 296/100 |
| 3,342,523 | 9/1967 | Lutgen | 296/100 |

Primary Examiner—Leo Friaglia
Assistant Examiner—Robert R. Song
Attorney—Flehr, Hohback, Test, Albritton & Herbert

[57] ABSTRACT

A telescopic cover assembly for open bed vehicles comprising a plurality of cover segments at least one of which is longitudinally movable relative to another. The movable segment carries wheel assemblies engageable with a pair of guide rails along which the segment is movable. Means are included for selectively elevating and lowering the movable segment during movement between extended and retracted positions. Detents are provided in which portions of the wheel assemblies are engageable for maintaining the movable cover segment in predetermined locations. Improved latch means also are provided for holding open a pivotal gate closure mounted at one end of the cover assembly.

26 Claims, 19 Drawing Figures

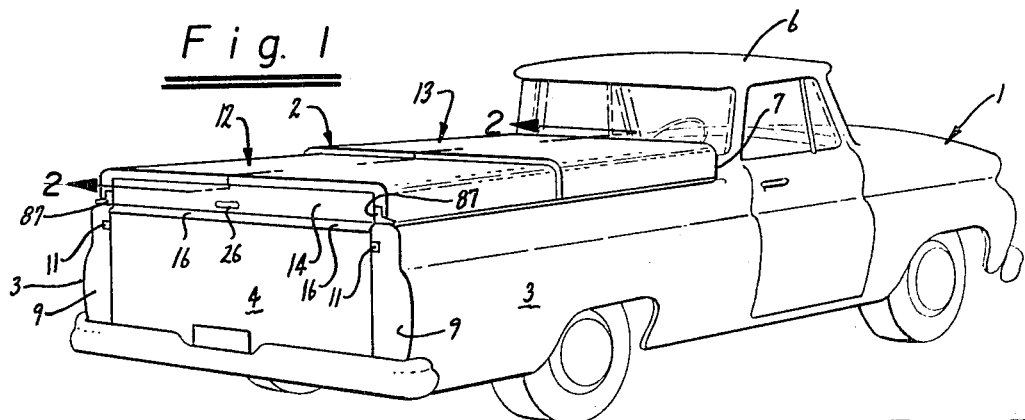
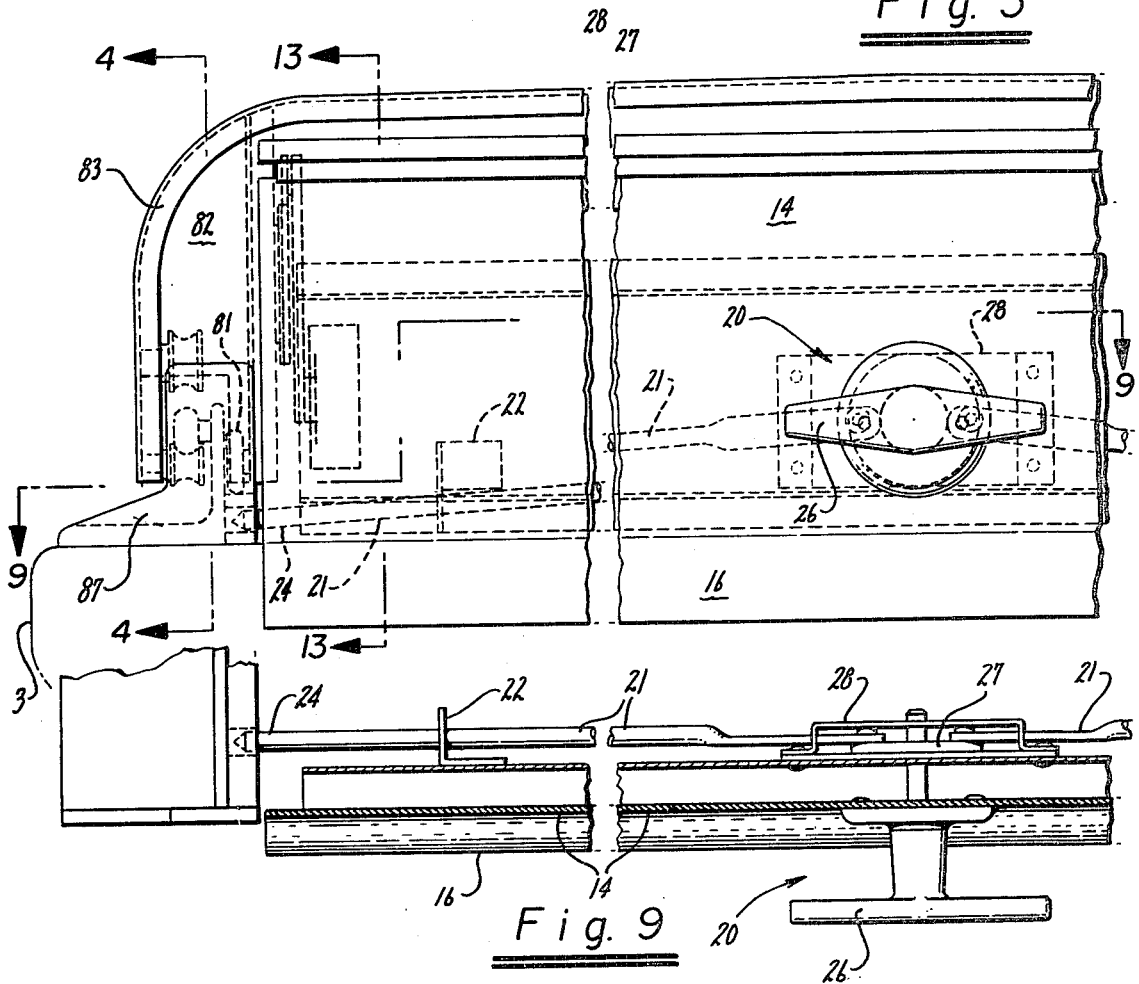
INVENTOR.
Edwin G. Anderson

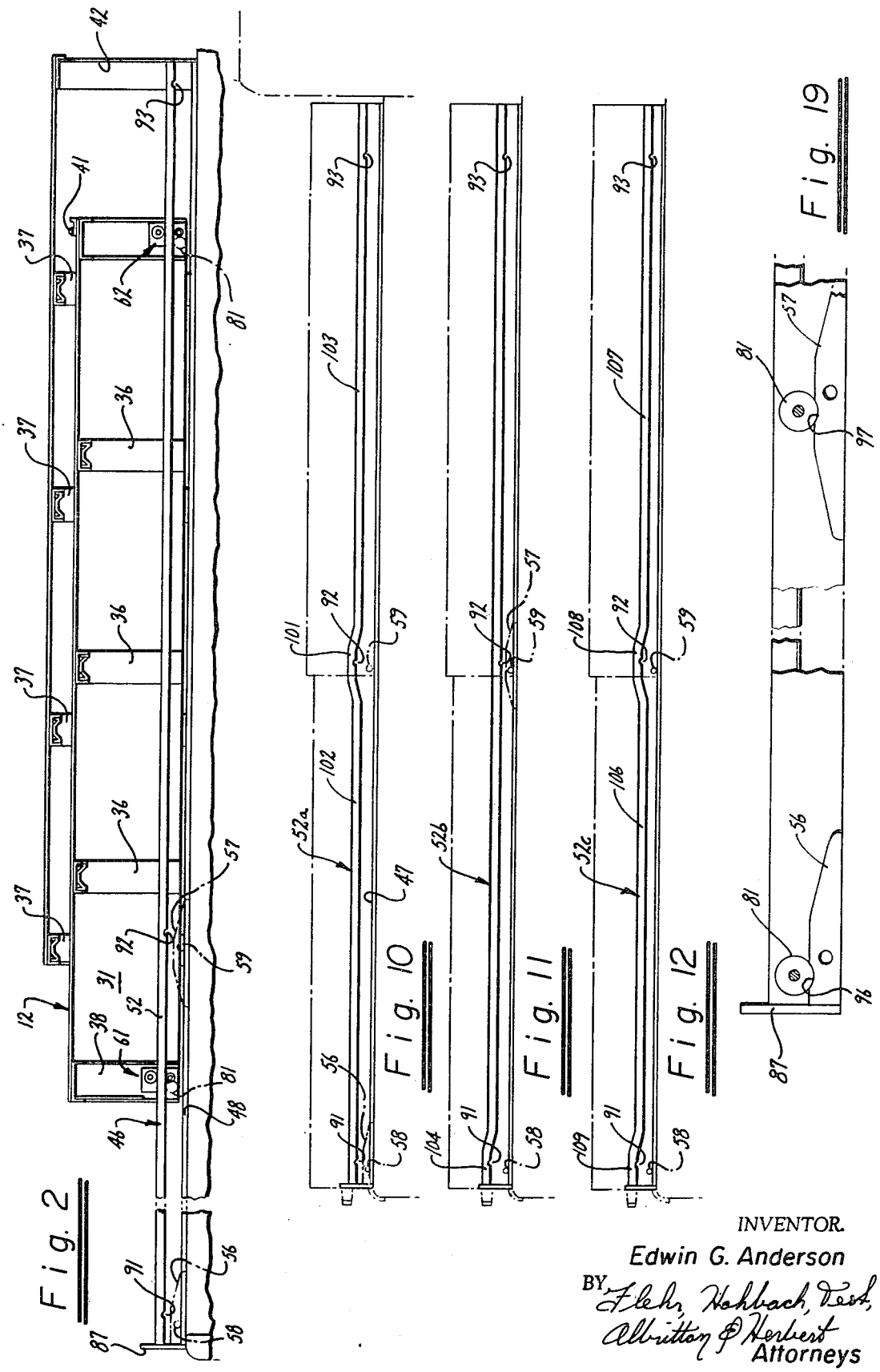

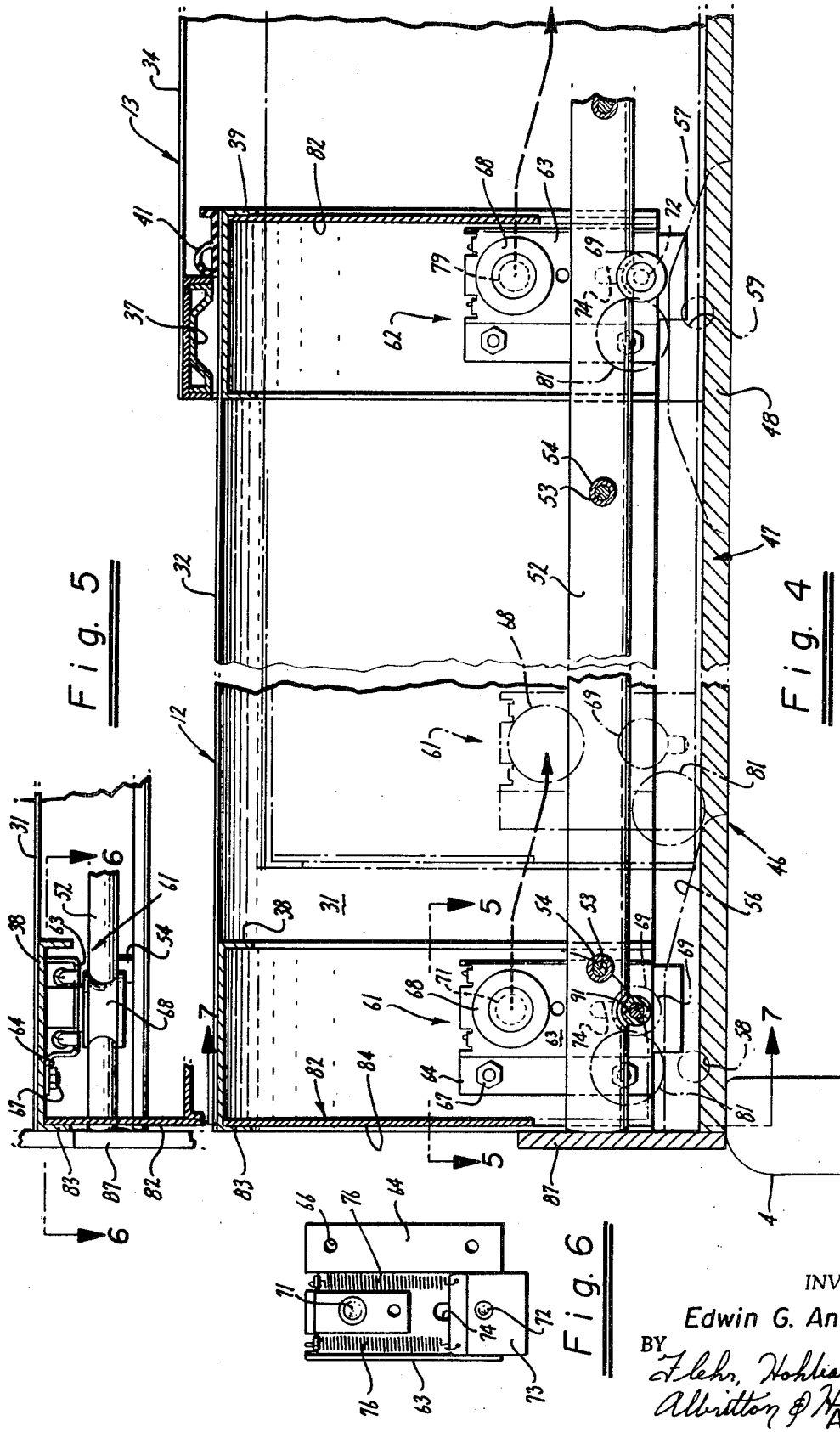

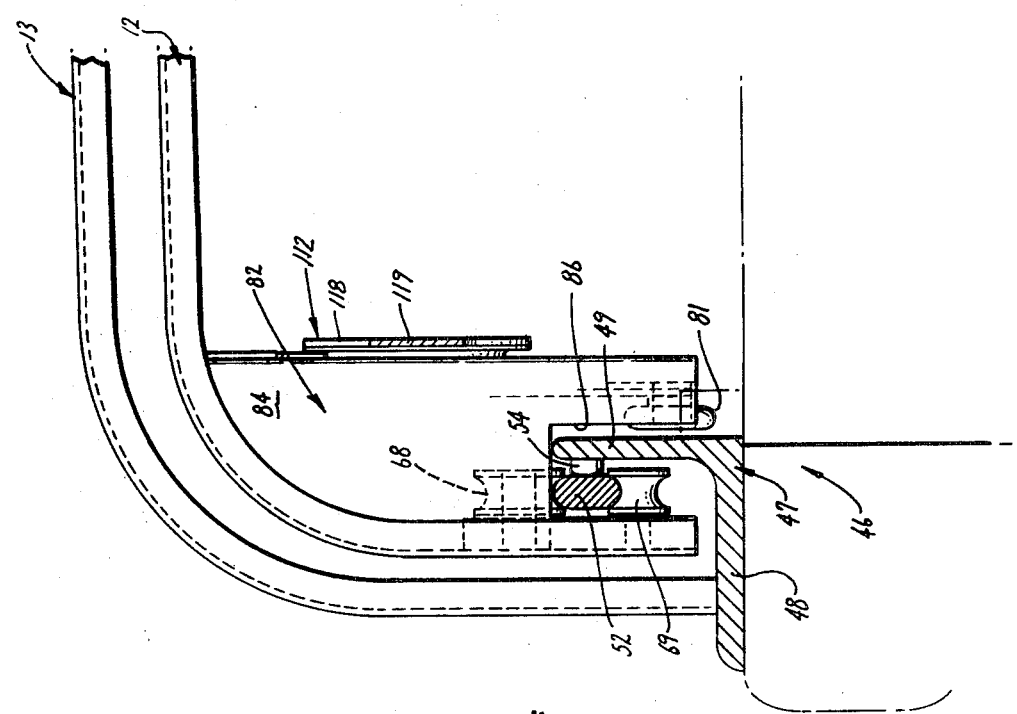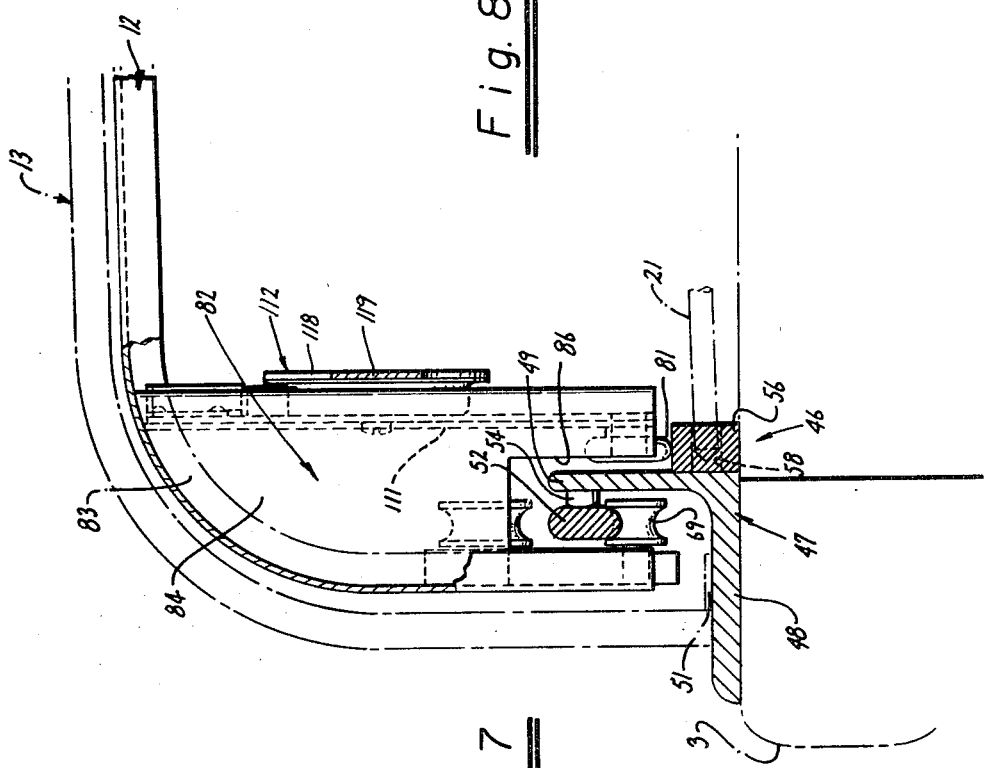

INVENTOR.
Edwin G. Anderson

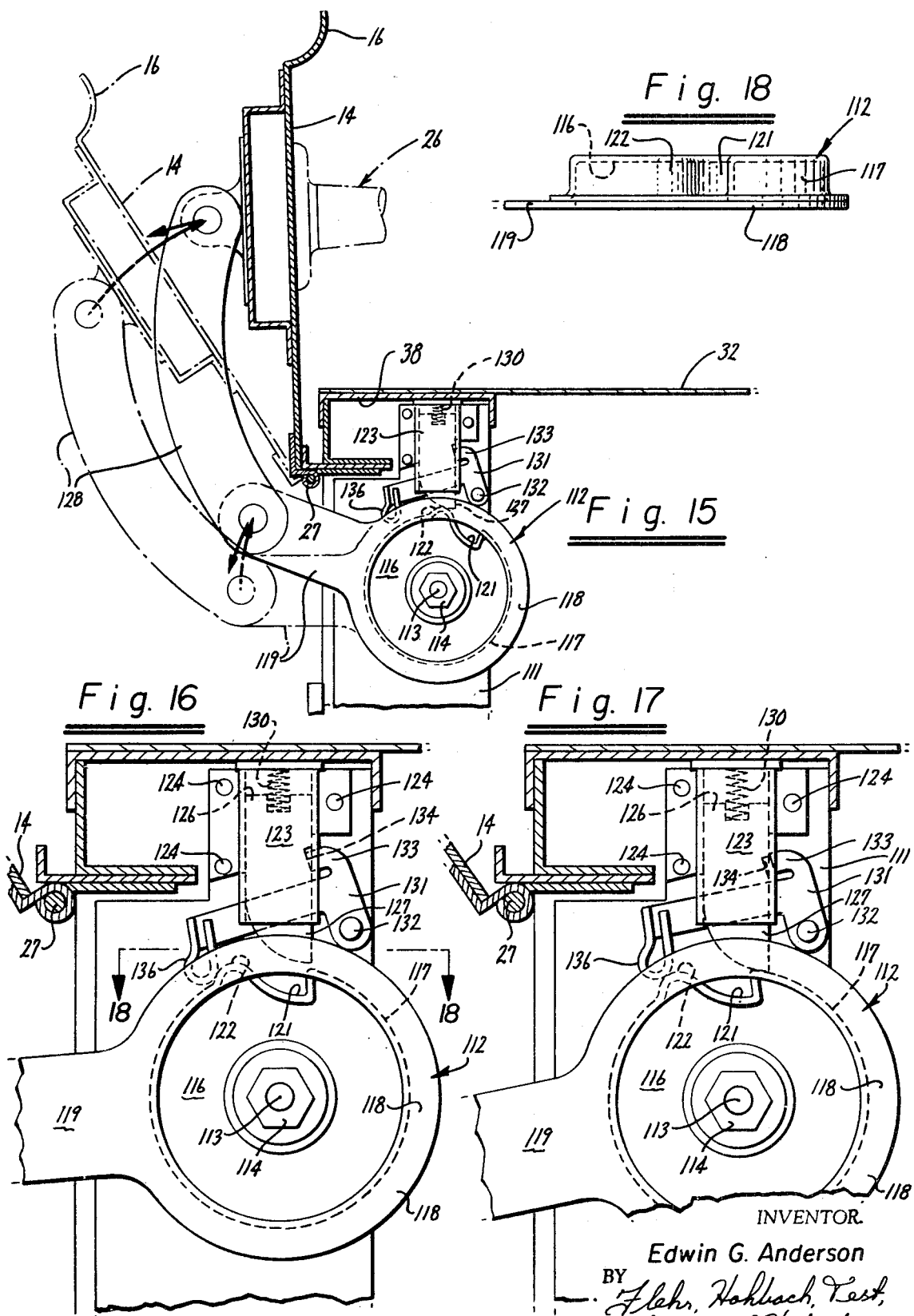

TELESCOPIC COVER ASSEMBLY FOR OPEN BED VEHICLES AND LATCH ASSEMBLY FOR USE THEREWITH

CROSS-REFERENCE TO RELATED APPLICATION

This application is a continuation-in-part of application Ser. No. 815,309 filed Apr. 11, 1969, now U.S. Pat. No. 3,578,378 entitled "Telescopic And Pivotal Cover Assembly For Open Bed Vehicles."

BACKGROUND OF THE INVENTION

1. Field of the Invention

This invention relates to cover assemblies for open bed vehicles, such as pickup trucks and the like. More particularly this invention relates to the field of telescoping covers for open bed vehicles in which at least one cover segment is movable relative to another segment or segments for selective positioning to overlie or expose the open bed of the vehicle.

Still more particularly, this invention relates to the field of telescopic cover assemblies for open bed vehicles in which a movable cover segment is elevated or lowered during movement thereof relative to retracted and extended positions. This invention further relates to means for pivotally mounting and actuating an end gate closure for one end of the cover assembly.

2. Description of the Prior Art

Telescopic covers for open bed vehicles have been known generally in the art heretofore. Typical of such prior known constructions are the cover structures shown in the following U.S. patents: Hershberger, U.S. Pat. No. 2,853,340; Hallock et al., U.S. Pat. No. 3,165,352; Lutgen, U.S. Pat. No. 3,342,523; and Bixell, U.S. Pat. No. 2,074,358. While the identified patents are representative of the type of vehicle bed covers available to the trade heretofore, none possesses the improved cover segment mounting and guide means disclosed herein by which a movable cover segment is effectively supported for telescopic movement. Nor do such patents disclose the improved latch assembly disclosed herein by which an end gate closure of a cover assembly is actuated during pivotal movement between open and closed positions.

The sturdy construction and ease of operation of the preferred embodiments of the telescopic cover assembly illustrated and described herein produce a structure superior to those disclosed in the patents noted above and others commercially available on the open market. So far as is known, the specific features of novelty stressed herein have not been known or utilized heretofore in conjunction with telescopic vehicle bed covers.

SUMMARY OF THE INVENTION

The subject invention relates to a telescopic cover assembly for open bed vehicles, such as pickup trucks and the like, in which a plurality of two or more sturdy, generally rigid, cover segments are mounted for movement relative to each other to permit selective exposure or covering of the bed of the vehicle on which the cover is mounted. To that end, improved means are provided for mounting and guiding at least one cover segment for longitudinal movement relative to another longitudinally fixed cover segment in telescopic fashion.

The movable segment is supported so that the same is provided with adequate clearance between itself and the fixed cover segment during movement so that contact and binding therebetween when the movable segment is traversed between its extended and retracted positions is obviated. To that end, means for mounting and guiding the movable cover segment is specifically formed to cooperate with special structure provided to elevate the movable segment into contact with the fixed segment when the movable segment reaches its extended position and to lower the movable segment as the same is moved from its extended position towards its retracted position. The cover assembly also includes improved structure for supporting the movable segment which includes wheel assemblies and detent means in association therewith for positively yet releasably retaining the movable segment in predetermined positions.

Improved means for closing the end of the cover assembly when the same is in its extended position also are provided and such improved means include a specially designed latch assembly for actuating an end gate closure of the assembly and for retaining such end gate closure in an open position when desired.

In conjunction with the disclosure of the aforementioned pending application Ser. No. 815,309, the present invention in the several embodiments thereof described herein is incorporatable into a telescopic cover which is also pivotal upwardly as a unit in the manner disclosed in the aforementioned application, as well as in a more conventional cover assembly in which such pivotal movement is not effectable. In that regard, the improved features of the aforementioned application and of the present invention lend themselves to incorporation into a single cover assembly and therefore the compatible features of such application are incorporated herein by reference. Specifically, details of the pivotal cover arrangement disclosed in the aforementioned application have not been included herein. However, it should be understood that such features may be included and combined with the novel features of this application if desired.

As with the cover assembly disclosed in the aforementioned application, the cover assembly of the present invention is constructed in such fashion that the same is very sturdy and capable of resisting the rough wear and tear to which a cover assembly is normally subjected. Also, the cover possesses generally watertight characteristics when extended so that maximum protection for cargo carried by the vehicle is afforded.

The construction of the present invention differs from that disclosed in the aforementioned application principally in the manner in which the movable cover segment is elevated and lowered during telescopic movement thereof and in the improved means by which an end gate closure is pivotally mounted for selective movement between open and closed positions as required during use of the cover assembly.

From the foregoing, it should be understood that objects of this invention, among others, include: the provision of an improved telescopic cover assembly for open bed vehicles; such as pickup trucks and the like; the provision of improved means for supporting and guiding a movable cover segment of a telescopic cover assembly during movement thereof between extended and retracted positions; the provision of improved means for pivotally mounting an end gate closure for a cover assembly; the provision of an improved end gate closure latch assembly; and the provision of an improved cover assembly which is capable of withstanding rough handling during repeated use as well as one which is substantially weathertight to provide maximum cargo protection.

These and other objects of this invention will become apparent from a study of the following disclosure in which reference is directed to the attached drawings.

DESCRIPTION OF THE DRAWINGS

FIG. 1 is an isometric view of a pickup truck-type vehicle on which the subject cover assembly is shown mounted above the open bed thereof, the cover being shown in the extended position covering such bed.

FIG. 2 is a longitudinal sectional view through one embodiment of the cover assembly taken generally in the plane of line 2—2 of FIG. 1 showing the movable cover segment partially retracted.

FIG. 3 is a partial rear elevational view of the cover assembly showing the end gate closure supported thereby.

FIG. 4 is a longitudinal sectional view through the cover assembly taken generally in the plane of line 4—4 of FIG. 3 illustrating details of the means provided for supporting and guiding the movable cover segment during telescopic movement thereof.

FIG. 5 is a horizontal sectional view through a rear portion of the movable cover segment taken in the plane of line 5—5 of FIG. 4.

FIG. 6 is a vertical sectional view taken in the plane of line 6—6 of FIG. 5.

FIG. 7 is a vertical sectional view taken in the plane of line 7—7 of FIG. 4 showing the movable cover segment in its extended position.

FIG. 8 is a view similar to FIG. 7 but showing the movable cover segment in its retracted position.

FIG. 9 is a horizontal sectional view through the end gate closure taken in the plane of line 9—9 of FIG. 3.

FIGS. 10, 11 and 12 are generally schematic longitudinal sectional view corresponding generally to the showing of FIG. 2 which illustrate alternate embodiments of structure provided for elevating and lowering the movable cover segment during telescopic movement thereof.

FIGS. 15 through 17 are views corresponding generally to FIG. 14 illustrating the sequence of operation of the latch assembly during movement of the gate closure from the open position to the closed position.

FIG. 18 is a partial plan view of the pivotal latch of the latch assembly taken in the plane of line 18—18 of FIG. 16.

FIG. 19 is a generally schematic view of a further modification of the structure for elevating and lowering the movable cover segment during telescopic movement thereof.

DESCRIPTION OF THE PREFERRED EMBODIMENTS

Figure 13:
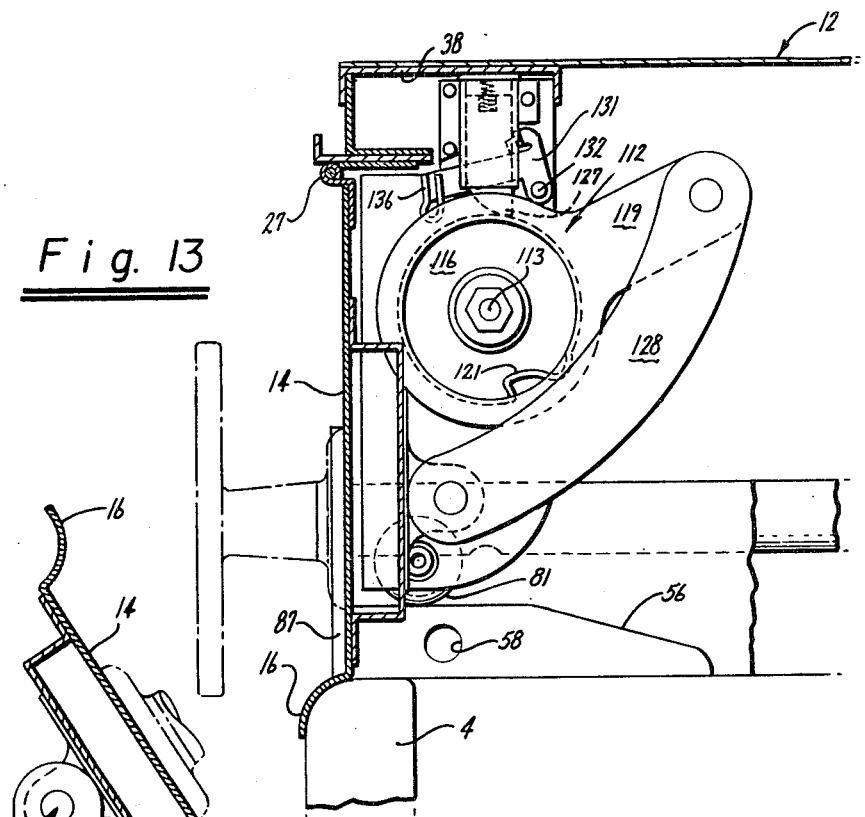
FIG. 13 is a vertical sectional view through the end gate closure of the cover assembly taken in the plane of line 13—13 of FIG. 3 illustrating details of the improved latch assembly thereof when the gate closure is closed.

In the pending application above identified, of which this is a continuation-in-part, a telescopic cover assembly is disclosed which includes novel features for mounting a movable cover segment which are closely related to those disclosed herein. This application amplifies the disclosure of the pending application by adding thereto a description of further embodiments for means and structure by which a movable cover segment may be supported for telescopic movement. This application further discloses an improved latch assembly by means of which a gate closure for a cover assembly may be actuated which is effective for positively and releasably holding the gate closure in an open position, yet which may be easily operated to permit rapid movement of the gate closure to a closed position.

While this application is directed primarily to the added alternatives and disclosure summarized above, it should be understood that the novel features stressed in the aforementioned application are equally applicable for use with the present invention. For a more detailed description of the advantages of telescopic cover assemblies of the improved type disclosed herein, and their important and improved features over prior known cover assemblies, reference is directed to the disclosure of the aforementioned application.

With the improved features of this invention and the relationship thereof to the previously filed application in mind, reference is directed to the following disclosure for a detailed description of the specific improvements incorporated in this invention.

In FIG. 1, the vehicle with which the subject invention is illustrated is a conventional pickup truck, designated 1. However, it should be appreciated that the invention is not restricted to use with automotive vehicles, or with automotive vehicles of the particular type illustrated. Also, the cover assembly shown in FIG. 1, which is generally designated 2, is of the "low-profile" type designed to cover the open bed of the vehicle without extending appreciably above the sidewalls 3 and pivotal end gate 4 of the truck body. However, it should be appreciated that this invention is also utilizable in a "high-profile" cover construction in which the cover assembly is designed to extend appreciably above the sidewalls 3 and end gate 4 of the vehicle up to or above the top of the cab 6 thereof. Such a high-profile cover increases appreciably the size and capacity of the protected cargo space of the truck bed lying beneath the cover.

As noted previously, the invention specifically described herein is shown in conjunction with a nontiltup cover construction in which the segments of the cover assembly are precluded from pivotal movement upwardly away from the position shown in FIG. 1. However, as also previously noted, the tiltup construction disclosed in the aforementioned application may be incorporated into the present invention if desired.

The truck-type vehicle shown includes the cab 6 from which a normally open truck bed projects rearwardly, the lateral margins of such bed being defined by the aforementioned upstanding truck body sidewalls 3. The rear wall 7 of the cab defines the front margin of the truck bed and the truck bed rear wall, collectively designated 8, is defined by the aforementioned pivotal end gate 4 and a pair of opposed rear wall panels 9 which cooperate to define the rear margin of the truck bed. End gate 4 is pivotally mounted in known fashion and is normally held in the closed position shown in FIG. 1 by a pair of conventional releasable latches 11 interposed between the end gate and the rear wall panels 9 in known fashion.

The cover assembly shown in FIG. 1 comprises two generally inverted U-shaped cover segments 12 and 13 which are movable relative to each other. That is, rear segment 12 in the illustrated embodiment is longitudinally movable forwardly from the extended position shown in FIG. 1 to be telescopically nested within the front fixed segment 13. When thus telescoped, substantially unrestricted access is granted to the vehicle bed covered by the assembly so that cargo may be easily placed therein or removed therefrom as required.

It should be understood, as will be pointed out hereinafter, that the opposite front and rear ends of the cover assembly are closed off by means to be described so that when the cover assembly is in the extended position shown in FIG. 1 an essentially watertight and weatherproof cover is provided over the vehicle bed lying therebeneath.

Means are provided in conjunction with the cover assembly for cooperating with the rear end wall 8 of the truck body to close off the end of the cover assembly and to permit locking of the same to prevent unauthorized access to the truck bed. Such means comprises an end gate closure, generally designated 14, which is hingedly and pivotally connected with the rear cover segment 12 for upward pivotal movement to an open position, as noted in FIG. 14. As seen in FIGS. 1 and 3, the end gate closure 14 is designed to partially overlie the tailgate 4 of the truck body and, for that purpose, includes a curved extension 16 which overlies and contacts the tailgate 4 when the end gate closure is closed to preclude downward movement of the tailgate. As will be described hereinafter, the end gate closure 14 includes an improved latch assembly for holding the gate closure in the open position shown in FIG. 14.

It will be noted from FIGS. 7 and 8 that the movable cover segment 12 is of somewhat smaller dimension than the front cover segment 13, although both segments possess generally the same cross-sectional configuration. Thus, nesting of the movable cover segment within the fixed cover segment is permitted when desired. It should also be understood that, although only two cover segments are employed in the arrangement illustrated herein, more than two cover segments may be utilized, and that more than one of such segments may be movably mounted as required to meet particular needs.

When the end gate closure 14 and its curved extension 16 are overlapping engaged with the tailgate 4 of the truck, forward longitudinal sliding movement of the rear cover segment 12 is positively precluded. To securely lock the end gate closure in place, latching means, generally designated 20, is provided as best seen in FIGS. 3 and 9 which comprises a pair of oppositely directed laterally extending latching arms 21 which pass through suitable guide brackets 22 secured by welding or the like to the inner surface of a plate 23 which defines the inner surface of the gate closure 14. The guide brackets 22 constrain movement of the rods 21 other than laterally in a direction generally parallel to the gate closure plate 23. As seen FIG. 9, opposite ends 24 of the respective latching rods are receivable in locking interengagement with a portion of the means by which the cover segments are secured to the truck body in the manner to be described.

Extension or withdrawal of the respective latching rods 21 to effect secure latching or unlatching of the gate closure is effected by a rotatable control handle 26 which is operatively connected through a conventional toggle mechanism, generally designated 27, with each of the latching rods 21 in known fashion. The toggle mechanism is positioned in a housing 28 bolted or otherwise secured to the gate closure plate 23 as seen in FIG. 9. Upon pivotal movement of the control handle the latching rods may be retracted to extended as desired to effect latching or unlatching of the gate closure. Preferably, a key lock structure (not shown) is incorporated into the operating handle 26 in known fashion to prevent unauthorized turning thereof. Thus, access to the truck bed may be positively precluded by an except authorized persons having a key a handle 26 when the tailgate 4 is up, the rear cover segment is in its extended position, and the end gate closure is down, latched and locked.

The width of the end gate closure 14 is determined generally by the spacing between the inner surface of the sidewalls 3 of the truck body. The gate closure preferably is of a width just slightly less than the spacing between the inner surfaces of such sidewalls, so that the gate closure may be pivoted to the down position even when the movable cover segment 12 is telescoped forwardly. Thus, the movable cover segment also may be latched in the retracted position if desired. When thus held retracted, cargo which projects above the upper level of the cover assembly can be handled in the vehicle.

The end gate closure 14 is hingedly connected with the rear cover segment by means of an elongated hinge structure 27 operatively interposed between the upper edge of the gate closure and cover segment. In that regard, the cover segment 12 is provided with an arcuate gate closure mounting plate 28 secured to the rear end of the cover segment in any suitable fashion, such as by welding or riveting the same to the rearmost reenforcing frame member of the segment as noted hereinafter.

The mounting plate 28 cooperates with other closure means, including a backup plate and an end cap structure, as will be described, which cooperate when the movable cover segment is in the extended position so that the entire rear of the track body is fully enclosed and weatherproof as noted in FIGS. 1 and 3.

As noted from FIGS. 2, 4, 7 and 8, each of the cover segments 12 and 13 is constructed in the form of a generally U-shaped inverted shell having opposed generally parallel sidewalls interconnected with a generally flat roof portion through rounded edges. The sidewalls 31 of the rear movable segment 21 and the roof portion 32 thereof preferably are formed from a single sheet of suitable metal, such as aluminum or aluminum alloy. Similarly, the sidewalls 33 and roof portion 34 of the front cover segment 13 are formed from a single sheet of metal, such as aluminum or aluminum alloy. Preferably, as perhaps best seen from FIG. 2, the respective cover segments are structurally reenforced at spaced locations along their lengths by a series of spaced channel-shaped frame members 36 and 37 in the respective cover segments 12 and 13. At its opposite rear and front ends, the movable cover segment 12 is provided with rigid generally U-shaped channel frame members 38 and 39 respectively which provide means for mounting wheel assemblies as will be described hereinafter. Mounted on the outerperiphery of the front reenforcing frame member 39 of the movable cover segment 12 is sealing means in the form of an elongated continuous rubber or plastic gasket strip, designated 41, which is adhesively or otherwise suitably secured to the outer surface of the sidewalls and top wall portion of cover segment 12. Thus, when the movable cover segment is in the extended position seen in FIG. 4, the sealing means 41 engages the inner margin of the end reenforcing frame member 37 of the cover segment 13 to provide an essentially weathertight seal between the two segments along their areas of contact as noted.

The reenforcing frame members described impart the necessary transverse rigidity and strength to the cover segment which will permit the same to withstand the very rough use to which it will normally be subjected. The cover segments and respective channel frame members described are secured together in any suitable fashion, such as by welding or riveting. If desired, the cover segments may also be provided with longitudinal reenforcing means to meet special needs.

As perhaps best seen in FIG. 2, the front end of cover segment 13 is enclosed by means of a sheet 42 of suitable metal, such as aluminum or aluminum alloy, formed to conform to the cross-sectional configuration of the cover segment and welded or otherwise secured to the front frame member 43 of the segment 13. Thus, the front end of the cover segment is enclosed to watertight, weatherproof fashion.

The front cover section 13 is fixedly secured to the truck body in watertight relationship, preferably in the manner disclosed in greater detail in the aforementioned pending application. In that regard, cover section 13 preferably is secured to the truck body by utilizing the means provided for mounting and guiding the movable cover segment to the body as set out hereinafter. As a result, the cover assembly may be assembled separate from the vehicle and then secured as a unit to the truck body when desired. Thus, the entire cover assembly may be fabricated separately to facilitate and expedite manufacturing procedures.

Further reference to FIG. 2 taken in conjunction with FIGS. 4 and 7 shows the means provided at opposite sides of the truck body for mounting the segments on the body and for guiding the movable segment for telescopic movement relative to the fixed segment. Such mounting and guiding means is generally designated 46 and in basic structural detail is closely related to the corresponding mounting and guiding means disclosed in the aforementioned patent application. However, the mounting and guiding means of the present invention is of somewhat simplified and improved construction which permits its manufacture more readily and at somewhat lower cost than the corresponding construction disclosed in the aforementioned application.

In the preferred embodiment illustrated, the mounting and guiding means includes a generally L-shaped metal mounting plate structure 47 (preferably of aluminum or aluminum alloy) which includes a horizontal portion 48 and an upright vertical portion 49. Preferably a mounting plate 47 extends the full length of the truck body along each side thereof and is secured thereto in any suitable fashion such as by bolting or welding in the manner described in greater detail in the aforementioned application. Some form of sealing means (not shown) desirably is interposed between the horizontal portion 48 of the mounting plate and the sidewalls 3 of the truck body.

As seen in dotted lines in FIG. 7, the cover segment 13 is fixedly secured by means of suitably arranged spaced angle brackets 51 secured to the inner surfaces of the opposite sidewalls of the fixed cover segment by riveting or welding. The brackets 51 in turn are secured by bolting or welding to the horizontal portion 48 of the mounting plate in weathertight fashion.

The mounting and guiding means further includes guide rail structure provided in conjunction with each of the mounting plate structures at opposite sides of the truck body. While in the drawings only one mounting plate structure and its associated guide rail structure are illustrated, namely those at the left side of the truck body looking forwardly, it should be understood that corresponding structures are provided along the right side of the truck body so that each of the cover segments is suitably and effectively supported on the truck body as described. The guide rail structure includes an elongated guide rail 52 which extends from closely adjacent the tailgate 4 of the truck to a position generally aligned with the frontmost edge of the cover segment 13 defined by the end closure plate 42 as seen in FIG. 2.

In the embodiments shown herein, the respective guide rails employed are continuous from one end thereof to the other. But, as noted previously, because this invention also lends itself to utilization with a tiltup cover structure of the type described in the aforementioned application, when so used such guide rails may be discontinuously formed to permit upward tilting of the cover assembly in the manner described in such application.

Preferably each of the guide rail structures disclosed herein is straight throughout all or the major portion of its length for the purpose to be described. Preferably, each of the guide rails, as best seen in FIGS. 7 and 8, is provided with a generally narrow oblong cross-sectional configuration having concave upper and lower surfaces and opposed flat sides. Such configuration minimizes friction of the supporting structure of the movable segment as the same moves therealong and permits smooth telescopic operation of the cover assembly while precluding clogging of the guide rail structure with dirt or other debris which might tend to accumulate adjacent thereto during use.

Guide rail 52 is supported by the mounting plate structure 47 at spaced locations along its length by suitable fasteners 53 having spacer sleeves 54 positioned therearound as seen best in FIG. 4. The spacer sleeves ensure proper and fixed spacing of the guide rail a uniform distance from the vertical portion 49 of the associated mounting plate. In that regard, it will be noted that the guide rail is supported by the fasteners 53 to extend along the outer side of the vertical portion 49 of the mounting plate. Also, as seen in FIG. 7, preferably the upper surface of the guide rail is positioned so that it is substantially coplanar with the upper edge of the vertical portion 49 of the mounting plate. By minimizing the height of the vertical portion 49 of the mounting plate, minimum obstruction is provided along opposite sides of the truck body when the cover segment 12 is moved to its telescopic retracted position within cover segment 12.

As noted from FIG. 2, the guide rail 52 employed in the first embodiment described, is straight throughout its length and structure separate from the guide rail is provided for effecting selective raising and lowering of the movable cover segment 12 as the same moves between its extended position and retracted position. Such elevating and lowering is effected to provide adequate clearance between the relatively movable cover segments as the same are telescoped so that the one will not interfere with the other during such movement and so that the same are brought into secure sealing engagement with each other in the manner best seen in FIG. 4 when the cover segment 12 is in its extended position.

In the embodiment shown in FIGS. 2, 7 and 8, such structure for selectively elevating and lowering the movable cover segment includes inclined means provided adjacent one end of the guide rail structure and also intermediate opposite ends of such structure with which the respective front and rear ends of the movable cover segment are selectively engageable when the same reaches its extended position. Such inclined means comprises a tapered metal guide block 56 provided at the rear end of the mounting plate structure and another tapered metal block 57 provided intermediate the opposite ends of such structure. It will be noted that each of the tapered blocks includes inclined surfaces which lead up to a generally horizontal surface in the manner perhaps best seen in dotted lines in FIG. 4. The tapered blocks of the elevating and lowering structure are secured to the inner side of the upright portion 49 of the mounting plate 47 in any suitable fashion, such as by welding.

The respective tapered blocks are spaced from each other a distance corresponding generally to and determined by the longitudinal length of the movable cover segment 12 so that portions at the front and rear ends of the movable cover segment may simultaneously engage the respective tapered blocks and ride thereupon to simultaneously elevate or lower such opposite ends of the cover segment as the same is moved between its extended and retracted positions. As seen in FIG. 4, the cover segment roof portion 32 is maintained generally horizontal when in the extended position due to the spaced positioning and corresponding vertical dimensions of the tapered blocks 56 and 57.

In the arrangement shown, the tapered blocks 56 and 57 serve a second function in that they are provided with openings 58 and 59 therein respectively which are provided to receive one of the aforementioned latching rods 21 by means of which the end gate closure 14 is held in the down position. Because each of the tapered blocks is provided with such a latching rod receiving opening, the gate closure may be latched in the down position when the movable cover segment is in the fully retracted or the fully extended position.

In those embodiments to be described hereinafter in which one or both of the tapered blocks mentioned is eliminated, it will be understood that similar openings for accommodating the ends of latching rods 21 in the respective positions noted will be provided directly in the mounting plate 47 provided at opposite sides of the truck body. Note FIGS. 10 through 12.

Provided in conjunction with the means for mounting and guiding the cover segments is support structure mounted on the movable cover segment at each of the opposite sides and opposite ends of such segment which are engageable with and movable along the respective guide rails during movement of the cover segment between its extended and retracted positions. Such support structure comprises means in the form of wheel assemblies mounted adjacent each of the respective front and rear ends of the movable cover segments at opposite sides thereof.

As best seen from FIGS. 4 through 6, the respective wheel assemblies 61 and 62 mounted at the respective front and rear ends of the movable cover segment are identical in construction and each includes an open metal housing 63 which includes a laterally extending flange portion 64 having holes 66 for receiving bolts 67 by means of which the housing may be secured to the rear end reenforcing frame members 38 of the movable cover segment as best seen in FIG. 5. In that regard, each wheel assembly 62 at the front end of the movable segment is similarly secured to its associated frame member 39. The wheel assemblies 61 and 62 at opposite ends of cover segment 12 are mounted on the same vertical level so that the cover segment roof portion will remain substantially horizontal during all positions of movement thereof.

Mounted on and supported by the housing 63 of each wheel assembly are spaced upper and lower wheels 68 and 69 respectively. Preferably upper wheel 68 is of somewhat larger diameter than lower wheel 69 and in the arrangement shown the upper wheel is fixedly mounted for rotary movement on the housing 63 by means of an axle 71 projecting from and secured to the housing. Lower wheel 69 however, is nonfixedly mounted on the housing to permit vertical movement thereof relative to the housing and to the upper wheel. In that regard, wheel 69 is mounted on a small axle 72 which extends through a wheel mounting plate 73 slidably positioned within the housing. The housing is provided with a slot 74 in which axle 72 is vertically slidable, lower wheel 69 moving therewith during such sliding motion.

The mounting plate 73 for the lower wheel is normally spring urged upwardly by a pair of tension springs 76 interposed between the wheel mounting plate and the top of the housing, as best seen in FIG. 6. Thus, under normal operating conditions, the springs pull or bias lower wheel 69 upwardly into engagement with the lower curved surface of the guide rail in all operating positions of the movable cover segment. At the same time, in most operating positions, the upper wheel 68 is held in secure rolling engagement with the curved upper surface of the guide rail by the biasing effect of the springs. This spring-urged construction for the wheel assembly ensures that the respective wheels are in proper rolling engagement with the guide rail under all operating conditions and in so doing the possibility of rattling and the like encountered with conventional structures known heretofore is obviated.

Additionally, the spring-urged construction of the wheel assembly permits the movable cover segment 12 to be elevated and lowered during telescopic movement thereof between its extended positions in the manner shown. Thus, when the cover segment is elevated in its fully extended position as seen in FIG. 4, the upper wheels 68 of the respective wheel assemblies are free of contact with the upper surface of the guide rails. The separation between the wheels as noted is permitted because of the spring-urged mounting of the lower wheels 69.

The wheel assemblies as thus far described correspond generally to the related structure shown in the aforementioned patent application. However, the wheel assemblies of the present invention differ from those described in the pending application in that the present assemblies include additional portions which are engageable with the inclined means defined by the tapered elevating and lowering blocks 56 and 57 mentioned previously. That is, with the present arrangement, the cover segment 12 is formed so that front and rear portions thereof, preferably portions which are cooperable with and form a part of the aforementioned wheel assemblies, are engageable with the respective inclined blocks when the cover segment reaches its extended position. In the arrangement shown, such portions of the cover segment are defined by enlarged rotatable wheels 81 secured adjacent the front and rear ends of the movable cover segment at opposite sides thereof. As noted from FIG. 4 taken in conjunction with FIGS. 13 and 14, when the movable cover segment 12 is in its extended position, such wheels 81 ride upon the inclined blocks 56 and 57 to elevate the cover segment as noted previously.

While the respective wheels 81 are separately mounted in the embodiment shown, they form an integral operating part of the respective wheel assemblies. It will be noted that the wheels 81 are mounted on the inner sides of the vertical portion 49 of the mounting plates 47 as best seen in FIGS. 7 and 8. In that regard, each of the wheels 81 is rotatably supported by an axle 80 which is secured to the lower end of a contoured backup plate, generally designated 82, as seen in FIGS. 3, 4, 7 and 8. Each such backup plate at the rear of the movable cover segment 12 is welded to the inner edge 83 of the reenforcing frame member 38 at the rear end of the movable cover segment. The backup plates at the front of the movable segment are similarly mounted.

The aforementioned curved end gate closure mounting plate 28 at the rear of segment 12 is also secured by welding or the like to frame member 38 so that the opposite side margins of the rear end of the movable cover segment are substantially fully enclosed as seen in FIG. 7. That is, the backup plate 82 includes a horizontal portion 84 which extends generally transverse to the axis of the guide rail 52 associated therewith to close off the ends of the movable cover segment at opposite side margins of the end closure plate 14 thereof. However, to permit the respective backup plates to move longitudinally over the guide rails associated therewith, it is necessary that each is provided with a cutout portion 86 at its lower end cover. Such cutout is open sided but is generally rectangular in outline to permit movement of the cover segment 12 along the guide rail as noted.

Preferably means is included in conjunction with the cover assembly to close off that portion of the movable cover segment defined by the respective cutouts 86 of the backup plates at the rear end of the movable segment. To that end, end closure means is provided at each of the opposite sides of the rear end of the cover assembly which, in the preferred embodiment shown, comprises a generally L-shaped end cap 87 (note FIGS. 3 and 4) secured to the rear end of associated mounting plate 47 and guide rail 52 in any suitable fashion, preferably by welding. Thus, when the movable cover segment 12 is in the fully extended position, the respective backup plates 82 are in direct contact with the respective end caps 87 so that the end of the cover assembly is completely closed as seen in FIGS. 1 and 3 to provide maximum protection to the vehicle bed and cargo contained therein from the elements of nature. In the absence of such end cap structure, entry of rain, snow and the like would be possible. Although not required, rubber or plastic sealing gaskets may be included with the respective end caps if desired to further enhance their closure ability.

Preferably provided in conjunction with at least one of the structures for elevating and lowering the movable segment is detent means with which at least part of at least one of the wheel assemblies is operatively engageable so that the cover assembly may be releasably retained in a predetermined position when such one wheel assembly is engaged with the detent means. In the arrangement shown in FIGS. 2 and 4, such detent means comprises at least one cutout formed in the undersurface of the guide rail 52. Preferably three such cutouts are provided in each guide rail, at opposite ends thereof and intermediate the ends thereof.

Such cutouts designated, 91, 92 and 93 respectively, are separated from each other so that the lower wheel 69 of the respective wheel assemblies at opposite ends of the movable cover section may be simultaneously engaged with two such cutouts. That is, as noted in FIG. 4, when the movable cover segment is in the extended position, the respective lower wheels 69 are engaged with cutout 91 adjacent the rear end of the guide rail and cutout 92 intermediate the opposite ends thereof. Conversely, when the cover segment is in the fully retracted position, the respective lower wheels 69 are engaged with the intermediate cutout 92 and cutout 93 adjacent the front end of the guide rail. The aforementioned springs 76 which urge the lower wheels 69 of the respective wheel assemblies upwardly ensure secure engagement of such lower wheels with the respective cutouts when the movable cover segment is one of the predetermined positions noted.

A variation in such detent means which may be employed is shown in FIG. 19. In such a modified arrangement, the respective inclined blocks 56 and 57 are provided with depressions 96 and 97 respectively in their upper surfaces. When the cover segment is positioned in the extended position, the wheels 81 supported thereon ride up on the inclined blocks and drop into the recesses 96 and 97 provided therein. Thus, upon such engagement of wheels 81 in the respective recesses, the cover segment is releasably retained in the predetermined extended position as noted.

With the embodiment thus far described, the inclined means provided in conjunction with the movable cover segment is defined by two spaced tapered blocks mounted on and supported by the respective mounting plate structures 47. FIGS. 10 through 12 show modifications of the inclined means of the support structure which may be employed with the present invention for selectively elevating and lowering the movable cover segment as noted. In FIG. 10, the modified guide rail 52a shown is generally straight for the major portion of its length but is provided intermediate its opposite ends with a short raised inclined portion 101 which cooperates with a tapered block 56 mounted as described previously adjacent the rear end of the mounting plate 47. The inclined portion 101 of the guide rail is interposed between two elongated aligned generally horizontal straight sections 102 and 103. The inclined portion defines a third generally horizontal section which is interconnected with sections 102 and 103 by two short inclined rail sections. Thus, as the cover segment is moved to its extended position, the wheel 81 at the rear end thereof will ride up on the inclined block 56 while at the same time the wheel assembly 62 at the front end of the assembly will ride up on the inclined portion 101. As noted previously, cutouts 91, 92 and 93 preferably are provided in conjunction with this embodiment also to retain the cover segment in its respective positions.

FIG. 11 shows a further modification in which a modified guide rail structure 52b is employed. Such guide rail is generally straight and horizontal for the major portion of its length and an inclined block 57 of the type noted previously is positioned intermediate opposite ends thereof. However, adjacent the rear end thereof the guide rail is provided with a short inclined portion 104 which includes a section which is generally horizontal which is connected with the elongated straight portion 106 of the rail by an inclined section interposed therebetween. Thus, with the arrangement shown in FIG. 11, the wheel assembly at the rear end of the movable cover segment will ride up on inclined portion 104 as the wheel 81 of the other wheel assembly at the opposite end thereof rides up on the inclined block 57.

FIG. 12 shows a further modification in which a modified guide rail 53c is defined by two aligned generally horizontal elongated portions 106 and 107 which have an elevated inclined portion 108 interposed therebetween. The construction of inclined portion 108 corresponds to that of the inclined portion 101 described previously with respect to FIG. 10. At its other end, the guide rail includes a second inclined portion 109 which corresponds in configuration and construction to the inclined portion 104 described previously with respect to FIG. 11. The inclined portions 108 and 109 are provided for the cover segment elevating and lowering functions as previously described.

Those modifications shown in FIGS. 10 through 12 which employ selective limited deformation of the guide rail differ from the gradually inclined guide rail structure disclosed in the aforementioned pending application in that the subject selective deformation may be readily effected on straight guide rails in readily available machinery. Such selectively and limited deformed guide rails may be manufactured less expensively than the gradually inclined guide rail structure disclosed in the aforementioned application and are preferred for certain installations as a result.

Irrespective of the particular type of inclined means utilized to selectively elevate and lower the movable cover segment as shown herein, the purpose and function of each is the same as described previously.

A further important feature of the present invention resides in the inclusion therein of an improved latch structure mounted in conjunction with the upwardly pivotal end gate closure 14 described previously. Referring to FIGS. 13 through 17, taken in conjunction with FIGS. 7 and 8, preferably one latch assembly is mounted at each of the opposite sides of the end gate closure. However, it has been found that duplication of those latch assemblies is not essential under all circumstances and a single latch assembly at one side of the gate closure may be employed if preferred.

In that regard, only one latch assembly will be specifically described herein, namely the latch assembly appearing at the left side of the movable cover segment looking forwardly from the rear thereof. Preferably the latch assembly is mounted by utilizing the aforementioned backup plate 82 which closes off one side margin of the rear of the movable cover segment. The transversely extending portion 84 of such backup plate has integrally connected therewith and extending normal thereto another upright portion 111 on the lower end of which is rotatably mounted the wheel 81 which comprises part of an associated wheel assembly.

Portions 111 and 84 of each backup plate may be formed in one piece by suitably bending an appropriately configured plate, or the same may be welded together from separate pieces if preferred. In either event, due to the connection of the vertical plate portion 84 with a sidewall of the movable cover segment 12, the latch assembly is firmly mounted for operation to support the gate closure 14 in the open position when desired.

The upright plate portion 111 defines a mounting bracket for the latch assembly which includes a pivotal latch 112 rotatably mounted by a pivot pin 113 and nut 114 on the bracket. The pivotal latch 112 includes a generally flat circular base 116 which is in rotary contact with the inner surface of bracket 111. A circular cylindrical wall 117 surrounds the latch base and is formed integral therewith as noted from FIG. 18. An enlarged circular flange 118 projects from the latch 112 in parallel relationship to base 116 and extending as an integral extension of that flange is a connector arm 119.

Formed within the wall 117 and projecting towards the axis of the latch is a recess 121 defined by an inwardly deformed portion of the wall. Closely adjacent the recess and projecting outwardly from the wall is an outwardly deformed camming projection 122.

The latch assembly further includes pawl means secured to bracket 111 which is selectively engageable in the recess 121 in the pivotal latch. Such pawl means includes an open housing 123 secured by rivets 124 or the like to the bracket 111. Slidably positioned within the housing and normally projecting from one end thereof is a pawl member 126 having its lower projecting end 127 rounded in one direction as seen in FIGS. 16 and 17. The pawl is normally spring urged in the direction to project from the housing by means of a coil spring 130 interposed between the inner end of the pawl and the base of the housing. The pawl is normally engaged in recess 121 or with the periphery of the cylindrical wall 117 of the latch member unless restrained from such engagement in the manner to be described.

Figure 14:
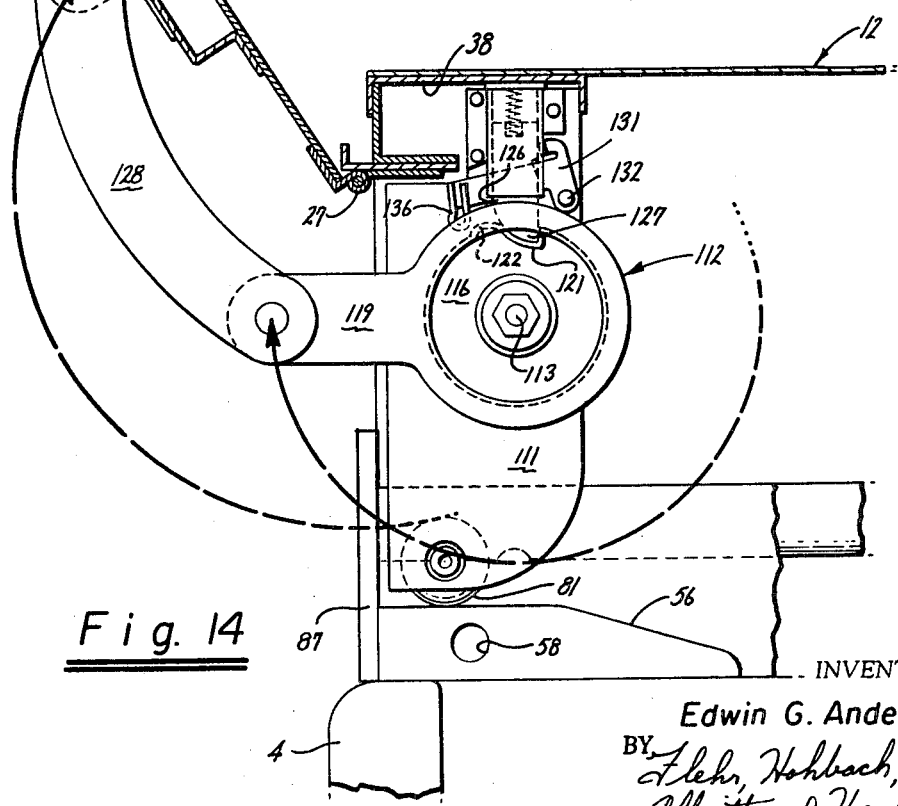
FIG. 14 is a view corresponding generally to FIG. 13 but showing the gate closure being held in the open position by the latch assembly.

The purpose of the pawl, as seen from FIG. 14, is to be received within recess 121 to thereby positively preclude rotation of the latch member in the counterclockwise direction when viewed in such figure. Because the pawl is rounded in only one direction, rotation in only one direction is precluded. However, because both the pawl end 127 and the recess 121 are rounded in conformity with each other, clockwise rotation of the latch when viewed in FIG. 14 is permitted.

When the latch is in the position shown in FIG. 14 with the pawl engaged in the recess, the end gate closure is securely held in the open position by means of a connecting link 128 which is operatively interposed between and pivotally connected with the connecting arm 119 of the latch member and a tab 129 provided on the end gate closure. Thus, counterclockwise rotation of the latch member when viewed in FIG. 14 is positively precluded so that downward movement of the end gate closure is also precluded.

Means is provided in conjunction with the latch assembly to permit selective disengagement of the pawl from the locking position shown in FIG. 14 within recess 121 so that the gate closure 14 may be pivoted downwardly to its closed position. Such means includes a catch 131 pivotally mounted on bracket 111 by means of a pivot pin 132 passing through a mounting extension on one end thereof. The catch includes an offset detent section 133 which is selectively engageable with pawl 126. As seen in FIGS. 16 and 17, the pawl is provided with a groove 134 in one edge thereof with which the offset portion of detent 133 of the catch is receivable when the pawl is depressed into the housing. In that regard, it should be understood that the side of the housing is open to permit selective engagement and disengagement of the catch detent with the pawl groove.

To that end, at its other end the catch is provided with an enlarged curved trip section 136 which is gravity responsive so that the catch normally tends to rotate in a counterclockwise direction when viewed in FIGS. 13 through 17. The trip section is normally gravity urged into contact with the cylindrical wall 117 of the latch member (although a spring could also be utilized) so that detent 133 thereof normally tends to become engaged in pawl groove 134.

When it is desired to pivot gate closure 14 from the fully closed position shown in FIG. 13 to the fully open position shown in FIG. 14, it is merely necessary to grasp and rotate handle 26 which controls the latching rods 21 aforementioned, and to pull upwardly on handle 26 which in turn causes rotation of the latch member 112 in the clockwise direction from the FIG. 13 position to the FIG. 14 position. Upon the latch member reaching the FIG. 14 position, the spring urging of pawl 126 will cause the pawl to become automatically engaged within recess 121 so that the end gate closure may be securely held in the position shown.

When it is desired to return the gate closure from the open position of FIG. 14 to the closed position of FIG. 13, the holding effect of the pawl must be first counteracted and that is effected in the sequence shown in FIGS. 15 through 17. In that regard, it is first necessary to pivot the gate closure further upwardly from the FIG. 14 position to the solid line position shown in FIG. 15. Such continued upward pivotal movement of the end gate closure effects further clockwise rotation of the latch member 112 which causes pawl 126 to be depressed upwardly when the cam 122 provided adjacent the recess 121 contacts the pawl end in the manner seen in FIG. 15. When the pawl is thus depressed, the gravitational effect on the trip section 136 of the catch forces the detent section 133 thereof to rotate counterclockwise and to become engaged with the pawl groove 134 as seen in FIG. 15. The pawl is thus held out of engagement with the recess.

Thereafter, the end gate closure may be pivoted downwardly because the pawl is not free to engage the recess 121. Counterclockwise rotation of the latch member brings cam 122 into engagement with the trip section 136 of the catch as seen in FIG. 16. Upon continued counterclockwise rotation of the latch to the position shown in FIG. 17, the trip section is forced to ride over the cam, thereby forcibly removing the detent 133 thereof from the pawl groove 134 so that the pawl is again let into engagement with the wall 117 of the latch member.

However, the detent and recess of the latch member are positioned relative to each other so that the pawl, when it is let into engagement with the latch member, cannot enter recess 121 as seen in FIG. 17. Upon continued counterclockwise rotation of the latch member by moving the end gate closure downwardly, the pawl merely rides on the periphery of the latch member wall 117 until the position shown in FIG. 13 is reached, in which the end gate closure 14 may be locked in place in the manner described previously. At that time, the pawl is properly positioned and is ready to drop into the recess 121 when the end gate closure is pivoted to the open position shown in FIG. 14 in the manner described previously.

Thus, the latch assembly described is automatically operable to permit selective holding of the end gate closure in the open position while being readily movable to the closed position when desired.

Having thus made a full disclosure of the various embodiments of this invention, reference is directed to the appended claims for the scope of protection to be afforded thereto.

I claim:

1. A telescopic cover assembly for covering the open bed of a vehicle, such as a truck, comprising
   A. at least two cover segments of different sizes and of inverted generally U-shaped cross-sectional configuration,
   B. means at opposite sides of said cover segments for mounting such segments on the body of said vehicle on opposite sides of said bed and for guiding at least one of said segments for telescopic movement relative to another segment between an extended position and a retracted position, each said mounting and guiding means including
      1. elongated mounting plate structure to be secured along one side of said vehicle body, and
      2. guide rail structure extending along said mounting plate structure and supported thereby for at least part of its length,
   C. support structure mounted on said movable cover segment which is engageable with and movable along said guide rail structures during movement of such segment between said extended and retracted positions, comprising
      1. a wheel assembly mounted adjacent each of the respective front and rear ends of said movable segment at opposite sides thereof, and
   D. structure in conjunction with said mounting and guiding means and said support structure for elevating said movable segment as the same moves to its extended position and for lowering such segment as the same moves toward its retracted position, comprising
      1. inclined means provided adjacent one end of each of said mounting plate structures and intermediate each of said mounting plate structures which are engageable by said wheel assemblies mounted on said cover segment.

2. The cover assembly of claim 1 in which said inclined means comprises
   a. at least one tapered block mounted at a predetermined location along the length of each of said mounting plate structures, and in which said support structure further includes at least one wheel assembly on each side of said movable cover segment which includes a portion thereof which is engageable with an associated tapered block when said cover segment is moved to its extended position.

3. The cover assembly of claim 2 in which each of the wheel assemblies last mentioned includes
   a. a rotatable wheel mounted thereon and defining said portion thereof which is engageable with an associated tapered block.

4. The cover assembly of claim 1 which further includes
   E. detent means in conjunction with at least one of said inclined means with which at least one of said wheel assemblies is engageable for releasably retaining said movable cover segment in a predetermined position when such one wheel assembly is engaged with said detent means.

5. The cover assembly of claim 1 in which said inclined means comprises
   a. a pair of spaced tapered blocks mounted on each of said mounting plate structures adjacent said one end thereof and intermediate the opposite ends thereof which are engageable by said wheel assemblies mounted on said movable cover segment as such segment approaches its extended position from its retracted position.

6. The cover assembly of claim 1 in which said inclined means comprises
   a. a pair of spaced tapered sections formed on each of said guide rail structures adjacent one end of such guide rail and intermediate the opposite ends thereof which are engageable by said wheel assemblies mounted on said movable cover segment as such segment approaches its extended position from its retracted position.

7. The cover assembly of claim 1 in which said inclined means comprises
   a. a tapered block mounted intermediate the opposite ends of the respective mounting plate structures which are engageable by the wheel assemblies mounted at one end of said movable cover segment as such segment approaches its extended position from its retracted position, and
   b. a tapered section formed at one end of the respective guide rail structures which are engageable by the wheel assemblies mounted at the other end of said movable segment as such segment approaches its extended position from its retracted position.

8. The cover assembly of claim 1 in which said inclined means comprises
   a. an inclined portion formed on the respective guide rail structures intermediate the opposite ends thereof which are engageable by the wheel assemblies mounted at one end of said movable cover segment as such segment approaches its extended position from its retracted position, and
   b. a tapered block mounted adjacent one end of the respective mounting plate structures which are engageably by the wheel assemblies mounted at the other end of said movable segment as such segment approaches its extended position from its retracted position.

9. The cover assembly of claim 5 in which each of said guide rail structures is mounted on an outer side of its associated mounting plate structure, and in which each of said tapered blocks is mounted on an inner side of its associated mounting plate structure.

10. The cover assembly of claim 7 in which each of said guide rail structures is mounted on an outer side of its associated mounting plate structure, and in which each of said tapered blocks is mounted on an inner side of its associated mounting plate structure.

11. The cover assembly of claim 8 in which each of said guide rail structures is mounted on an outer side of its associated mounting plate structure, and in which each of said tapered blocks is mounted on an inner side of its associated mounting plate structure.

12. The cover assembly of claim 1 in which each of said wheel assemblies comprises
 a. a housing,
 b. upper and lower wheels rotatably mounted on said housing for rolling engagement with an associated guide rail structure, and
 c. spring structure engaged with at least one of said wheels for normally urging the same into engagement with said guide rail structure and permitting selective separation of said wheels from each other.

13. The cover assembly of claim 12 in which at least one of said guide rail structures includes
 a. spaced cutouts formed in an undersurface thereof along which one of said wheel assemblies is movable,
 b. said cutouts being formed at predetermined locations along such guide rail structure for engagement with the lower wheel of such one wheel assembly to retain said movable cover segment in a predetermined position in accordance with the location of said cutouts.

14. The cover assembly of claim 3 in which said inclined means further includes
 b. a recess formed in at least one of said tapered blocks in which said wheel of an associated wheel assembly is receivable when said movable cover segment is in its extended position so that such segment may be releasably retained in such position.

15. The cover assembly of claim 1 in which each of said guide rail structures is generally straight throughout its length.

16. The cover assembly of claim 1 in which each of said guide rail structures includes
 a. first and second generally straight horizontal portions extending inwardly toward each other from opposite ends thereof on the same level,
 b. a third generally straight horizontal portion intermediate said opposite ends on a higher level than said first and second portions, and
 c. two inclined portions connecting said first and second portions with said third portion.

17. The cover assembly of claim 1 in which each of said guide rail structures includes
 a. an elongated generally straight horizontal portion extending inwardly from one end thereof, and
 b. a second generally straight horizontal portion extending inwardly from the other end thereof on a higher level than said first portion and terminating adjacent said other end, and
 c. an inclined portion interposed between and connecting said first and second portions.

18. The cover assembly of claim 1 in which said support structure further includes
 2. a backup plate secured to each of the opposite sides of said movable cover segment at the rear end thereof adjacent said wheel assemblies mounted at such opposite sides of said cover segment rear end, 3. each said backup plate having a cutout therein which permits such plate to move along its associated guide rail structure as said movable cover segment moves between its extended and retracted positions.

19. The cover assembly of claim 18 which further includes
E. an end cap secured to the rear end of each of said mounting plate structures and guide rail structures at opposite sides of said vehicle bed,
 1. each such end cap being engaged by a backup plate secured to the rear end of said movable cover segment when such segment is in its extended position, each such end cap thereby closing off the cutout in its associated backup plate.

20. The cover assembly of claim 1 which further includes
E. an upwardly pivotal gate closure hingedly supported on one end of one of said cover segments for closing off said segment end, and
F. a pawl and recess operated latch assembly interposed between said one cover segment and said gate closure for selectively maintaining said gate closure in an open position.

21. The cover assembly of claim 20 in which said latch assembly comprises
 1. a mounting bracket secured to said one cover segment adjacent said gate closure,
 2. a pivotal latch having a recess therein mounted for rotary movement on said bracket,
 3. a pawl selectively receivable within said recess when said latch is in a first predetermined position in which said gate closure is held open,
 4. a catch selectively engageable with said pawl for holding the same out of engagement with said recess so that said latch may be rotated between said first position and a second predetermined position in which said gate closure is closed, and
 5. link means operatively connected between said latch and said gate closure for effecting pivotal movement of said latch when said gate closure is moved to its open position and for holding said gate closure open when said pawl is engaged in said recess when said gate closure reaches said open position.

22. A telescopic cover assembly for covering the open bed of a vehicle, such as a truck, comprising
A. at least two cover segments, of different sizes and of inverted generally U-shaped cross-sectional configuration, one of which is telescopically movable relative to the other,
B. means at opposite sides of said cover segments for mounting said cover segments on the body of said vehicle on opposite sides of said bed for telescopic movement of said one segment relative to said other segment between an extended position and a retracted position,
C. support structures mounted on said movable cover segment adjacent the respective front and rear ends thereof which are engageable with and movable along said mounting means during movement of such movable segment between said extended and retracted positions,
D. backup plate structures secured to opposite sides of said movable cover segment at said rear end thereof,
 1. each said backup plate structure having a cutout therein which permits such backup plate structure to move along its associated mounting means as said movable cover segment is moved between said extended and retracted positions, and
E. end cap structures secured to the rear ends of said mounting means at opposite sides of said vehicle bed,
 1. each such end cap structure being engageable by a backup plate structure secured to the rear end of said movable segment when such movable segment is in its extended position, each such end cap structure thereby closing off the cutout in its associated backup plate structure.

23. The telescopic cover assembly of claim 22 which further includes

F. gate closure means operatively connected with said movable cover segment to close off the rear end of said movable segment in all positions thereof and to open such rear end to permit access to the interior of such segment, comprising
   1. a closure plate mounted interiorly of said backup plate structures which is selectively movable between a closed position in which said rear end of said movable segment is closed off and an open position in which such rear end is open and unrestricted,
   2. said closure plate being of a width which is slightly less than the spacing between the inner surfaces of the opposed sidewalls of said vehicle which define opposite sides of said open bed so that said closure plate may be moved to its closed position and locked therein when said movable cover segment is in either its extended position or retracted position.

24. The telescopic cover assembly of claim 23 in which said gate closure plate is
   3. movably supported at said rear end of said movable cover segment for upward and downward movement relative to and between said opposed inner surfaces of said vehicle sidewalls in all positions of said movable cover segment.

25. The telescopic cover assembly of claim 24 which further includes

G. a pawl and recess operated latch assembly interposed between said one cover segment and said gate closure means for selectively maintaining said gate closure means in said open position.

26. The cover assembly of claim 25 in which said latch assembly comprises
   1. a mounting bracket secured to said one cover segment adjacent said gate closure means,
   2. a pivotal latch having a recess therein mounted for rotary movement on said bracket,
   3. a pawl selectively receivable within said recess when said latch is in a first predetermined position in which said gate closure means is held open,
   4. a catch selectively engageable with said pawl for holding the same out of engagement with said recess so that said latch may be rotated between said first position and a second predetermined position in which said gate closure means is closed, and
   5. link means operatively connected between said latch and said gate closure means for effecting pivotal movement of said latch when said gate closure means is moved to its open position and for holding said gate closure means open when said pawl is engaged in said recess when said gate closure means reaches said open position.

* * * * *